US005491579A

United States Patent [19]
Justus et al.

[11] Patent Number: 5,491,579
[45] Date of Patent: Feb. 13, 1996

[54] BROADBAND THERMAL OPTICAL LIMITER FOR THE PROTECTION OF EYES AND SENSORS

[75] Inventors: Brian L. Justus; Alan L. Huston; Anthony J. Campillo, all of Springfield, Va.

[73] Assignee: The United States of America as represented by the Secretary of the Navy, Washington, D.C.

[21] Appl. No.: 251,146

[22] Filed: May 31, 1994

[51] Int. Cl.$^6$ .................................................. G02F 1/01
[52] U.S. Cl. .......................................... 359/241; 359/601
[58] Field of Search ..................................... 359/241, 299, 359/738, 601, 885, 614, 886; 351/213; 372/11

[56] References Cited

U.S. PATENT DOCUMENTS

| | | | |
|---|---|---|---|
| 5,018,842 | 5/1991 | Chen | 350/354 |
| 5,080,469 | 1/1992 | McCahon et al. | 359/241 |
| 5,208,698 | 5/1993 | Muller | 359/299 |
| 5,252,256 | 10/1993 | Tutt et al. | 252/582 |
| 5,280,169 | 1/1994 | Honey et al. | 250/216 |
| 5,283,697 | 2/1994 | Tutt et al. | 359/885 |
| 5,325,227 | 6/1994 | Templeton et al. | 359/241 |

OTHER PUBLICATIONS

B. L. Justus et al., "Excited–State Absorption–Enhanced Thermal Optical Limiting in $C_{60}$", *Optics Letters*, vol. 18, No. 19, pp. 1603–1605, (Oct. 1, 1993).
B. L. Justus et al., "Broadband Thermal Optical Limiter", *Appl. Phys. Lett.* 63 (11), pp. 1483–1485 (13 Sep. 1993).
Lee W. Tutt et al., "A Review of Optical Limiting Mechanisms and Devices Using Organics, Fullerenes, Semiconductors and Other Materials", *Prog. Quant. Electr.*, pp. 299–338 (1993).

*Primary Examiner*—Mark Hellner
*Attorney, Agent, or Firm*—Thomas E. McDonnell; George Jameson

[57] ABSTRACT

A broadband thermal optical limiter for protecting a light-sensitive object from intense laser beams at all near ultraviolet, visible and near infrared wavelengths is disclosed. The broadband thermal optical limiter comprises: a sample cell containing a solution of broadband absorber material dissolved in a thermal solvent; and a first optical device for converging an incident laser beam into the sample cell. The sample cell is responsive to a converged incident laser beam below a predetermined intensity level for passing therethrough the converged incident laser beam below the predetermined intensity level. The sample cell is also responsive to a converged incident laser beam at or above a predetermined intensity level for thermally defocusing substantially all of the converged incident laser beam in different directions and passing therethrough only a remaining small portion of the converged incident laser beam at or above the predetermined intensity level. The broadband thermal optical limiter further includes a second optical device for focusing substantially all of the laser beam passing through the sample cell into the light-sensitive object to be protected. A collecting aperture may be disposed in front of the second optical device for substantially blocking all light deflected by the protective element and passing therethrough into the second optical device only a small portion of the focused incident light beam at or above the predetermined intensity level.

17 Claims, 6 Drawing Sheets

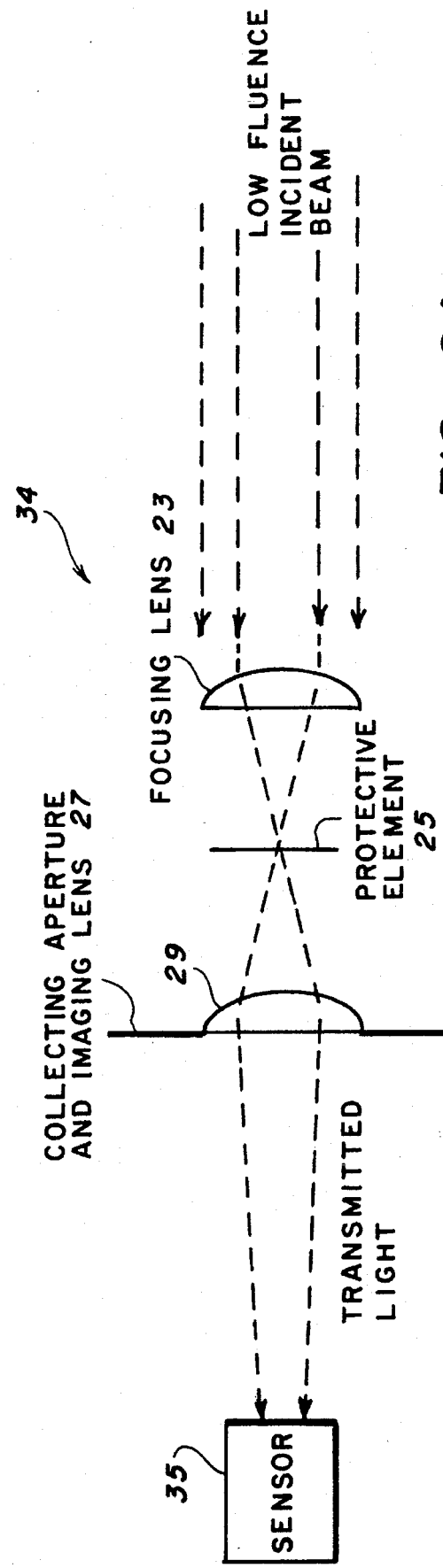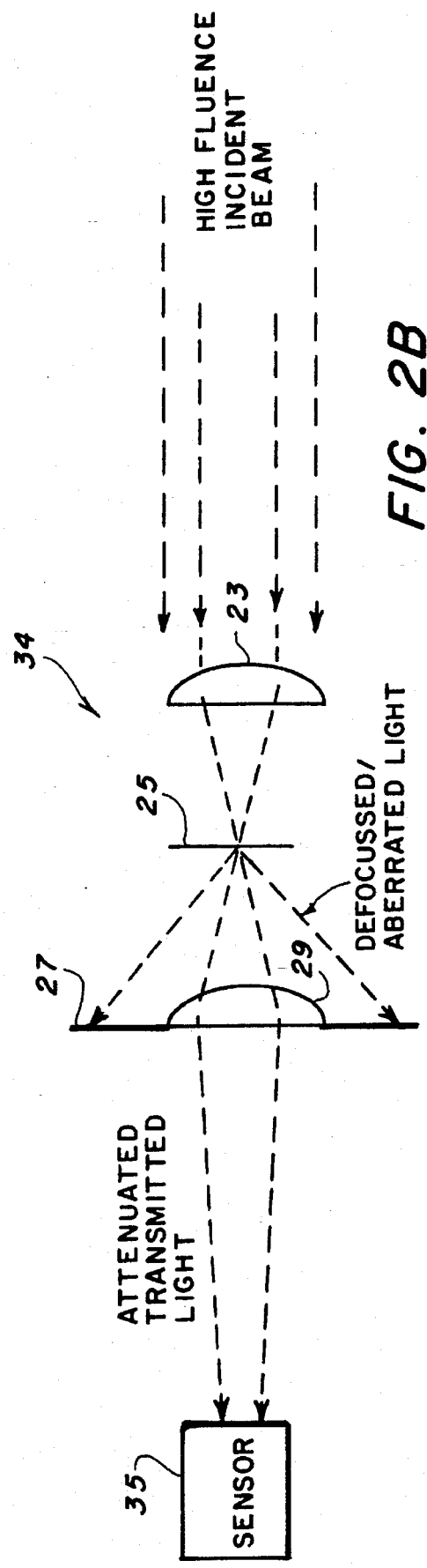

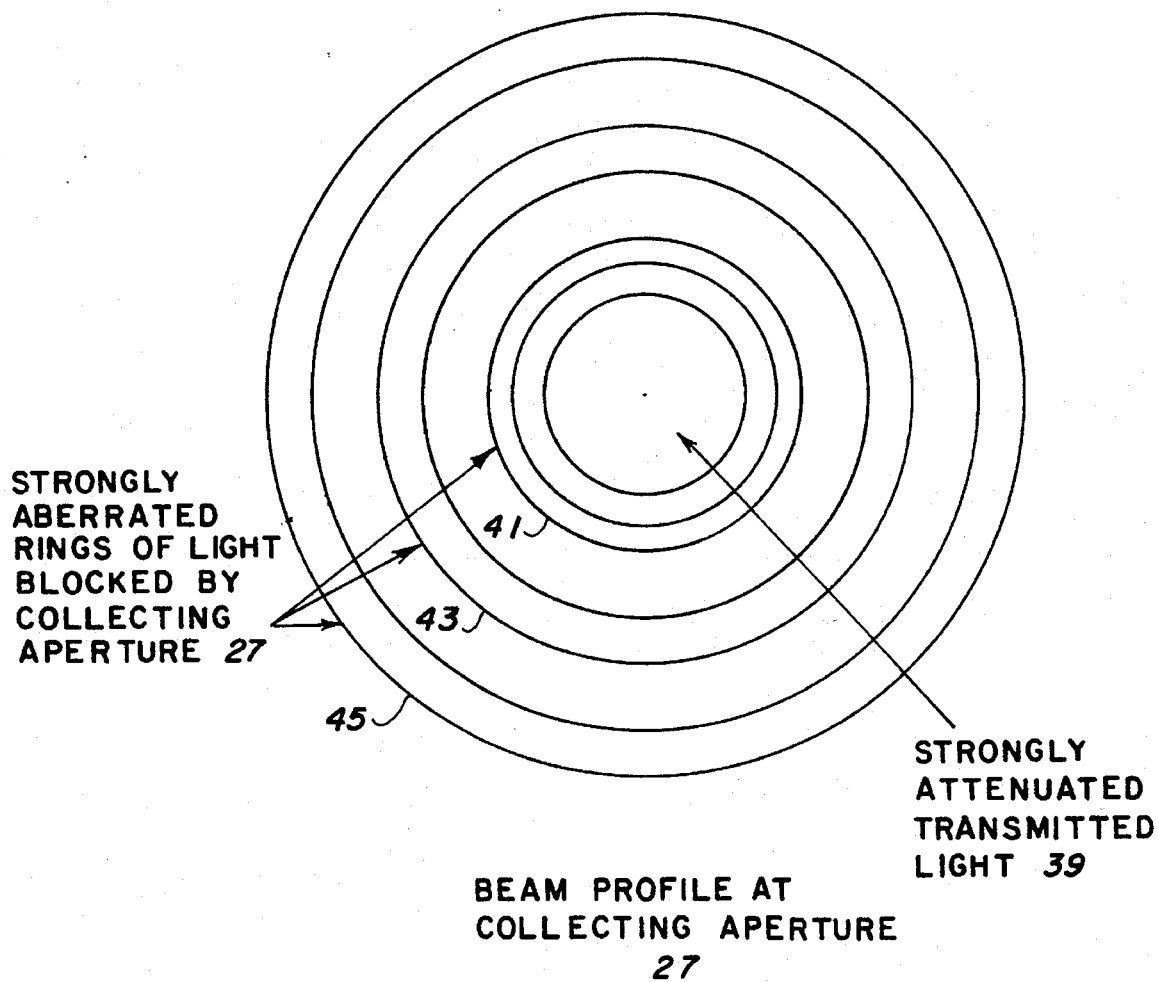

BROADBAND THERMAL OPTICAL LIMITER FOR THE PROTECTION OF EYES AND SENSORS

FIELD OF THE INVENTION

The present invention relates to optical limiters and particularly to a passive optical limiter for protecting eyes and sensors from intense laser radiation at all near ultraviolet, visible and near infrared wavelengths.

DESCRIPTION OF THE RELATED ART

The protection of eyes and sensors from damage due to sources of intense light, such as laser radiation, is a problem of current interest in both commercial and military environments. Nonlinear optical materials (materials whose optical properties, such as the index of refraction or absorption coefficient, are dependent on the intensity of the incident light) have been used in passive optical devices designed to reduce or limit the fraction of light transmitted through the device as the incident intensity is increased.

The simplest optical geometry used in such a device is a dual lens (focus and recollimate) arrangement, chosen because of the large optical magnifications (high light intensities) which can be achieved in the nonlinear material, also because it can offer a wide field of view (critical for eye vision), and finally because it is a common scheme which occurs in many devices of interest to the military (such as, for example, periscopes, binoculars, gunsights and missile guidance systems) and to commerce (such as, for example, various laser applications).

The first lens (focusing lens) of such a dual lens arrangement focuses the incident beam onto a suitable material to maximize the nonlinear optical effects of the available energy. At low intensities, the nonlinear element has little effect on the beam and a second lens (imaging lens) of such a dual lens arrangement recollimates the light for transmission to the eye or sensor optics. However, it should be noted that in practice a second dual lens arrangement would be required to reinvert the image for vision applications. In combination with the lenses, entrance and collecting apertures establish the relevant f/number of the arrangement. When adjusted to the same size as the entrance aperture, the collecting aperture passes 100% of the low intensity light. At high intensities, the nonlinear element defocuses the light, overfilling the collecting aperture, which spatially truncates and limits the magnitude of the transmitted beam.

The prior art in such defocusing limiters has utilized the electronic ($\chi^{(3)}$) or orientational (Kerr) nonlinearities of semiconductors or organic compounds to defocus the incident light. There are a number of important requirements that must be met by the nonlinear material if it is to be used as the protective element in a defocusing optical limiter. These important requirements are:

1. It must possess a large, defocusing nonlinearity that, for the application of eye protection, is sufficient to limit the transmitted fluence to levels considered to be safe for retinal exposure ($< 0.5$ $\mu J/cm^2$). For sensor protection the transmitted fluence must be below the sensor damage threshold.

2. For eye protection, it must have a broadband spectral response to provide protection over all vision response wavelengths. For sensor protection, response over the entire ultraviolet/visible/infrared spectrum is required, depending on the sensor responsivity.

3. It must have high transmission of the low intensity light.

4. It must be compatible with low f/number optics.

5. It must have a large refractive index change ($\Delta n_{sat} > 0.1$) before saturation occurs.

6. The material must have a fast yet persistent temporal response. In particular, limiting against Q-switched pulses in the range of 6 ns (nanoseconds) to 100 ns is generally regarded as the most important temporal regime and represents an absolute minimum material requirement.

7. It must possess either a high threshold for optical damage or the ability to recover between shots.

These seven requirements pose a severe test that has not been passed satisfactorily by currently available refractive materials. In particular, the low f/number requirement leading to the need for large $\Delta n_{sat}$ rules out most materials. The requirement for broadband response rules out the use of resonant semiconductor or organic nonlinearities. Nonresonant nonlinearities, although broadband, fail the requirements specified in paragraphs 1, 5 and 6 above.

Thermally induced refractive index changes in gases, solids and liquids are well understood. At high light intensities, refractive thermal blooming is accompanied by thermal aberrations which spatially redistribute the beam so that a significant amount of the energy originally in the center appears as rings at large angles with respect to the propagation direction of the light. These rings are conveniently blocked by an aperture thereby limiting the transmitted energy. A purely refractive thermal mechanism was proposed some time ago for the control of the output power of a cw (continuous wave) laser. However, it has been commonly assumed that the temporal response of a purely thermal mechanism is too slow to yield effective optical limiting of high energy, ns duration laser radiation. In fact, for a tightly focussed beam the build-in time of the refractive nonlinear response can be on the order of a nanosecond.

SUMMARY OF THE INVENTION

It is therefore an object of the invention to provide an improved optical limiter apparatus.

Another object of the invention is to provide an optical limiter apparatus for limiting the intensity of a high power incident laser beam.

Another object of the invention is to provide an optical limiter apparatus for limiting the intensity of a high power incident laser beam by using a refractive thermal nonlinear optical mechanism.

Another object of the invention is to provide an optical limiter apparatus which provides an improved broadband spectral response.

Another object of the invention is to provide an optical limiter apparatus which provides an improved wide field-of-view.

Another object of the invention is to provide an optical limiter apparatus which provides an improved temporal response in the range from ns (nanoseconds) to ms (milliseconds).

Another object of the invention is to provide an optical limiter apparatus which passes low energy light therethrough, but only passes a small portion of high energy light therethrough.

Another object of the invention is to provide an optical limiter apparatus having an optical limiter which contains an absorbing material dissolved in a solvent for thermally defocusing substantially all incident light above a predetermined intensity level.

Another object of the invention is to provide an optical limiter apparatus having an optical limiter which contains a solution of nigrosin dissolved in carbon disulfide.

A further object of the invention is to provide an optical limiter apparatus for passing through a collecting aperture to a light-sensitive object an incident light beam below a predetermined intensity level, and for deflecting substantially all of an incident light beam above a predetermined intensity level in different directions and passing through the collecting aperture to the light-sensitive object only a small portion of the incident light beam above the predetermined intensity level.

These and other objects of this invention are achieved by providing a passive optical limiter comprising: a first optical device for converging an incident light beam to a focal point; a protective element disposed at the focal point, the protective element being responsive to a converged incident light beam below a predetermined intensity level for passing through a collecting aperture substantially all of the converged incident light beam below the predetermined intensity level, the protective element being responsive to a converged incident light beam at or above the predetermined intensity level for deflecting substantially all of the converged incident light beam in different directions and passing through the collecting aperture only a small portion of the converged incident light beam at or above the predetermined intensity level; and a second optical device for focusing substantially all of the light passing through the collecting aperture onto a light-sensitive object.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein:

FIG. 2A illustrates a schematic diagram of the optical limiter apparatus of the invention under an operational condition of an incident low intensity light beam;

FIG. 2B illustrates a schematic diagram of the optical limiter apparatus of the invention under an operational condition of an incident high intensity light beam;

FIGS. 3A and 3B illustrate the optical limiting operation of the optical limiter of FIG. 2B in response to an incident high intensity light beam;

DETAILED DESCRIPTION OF THE PREFERRED EMBODIMENT

Figure 1:
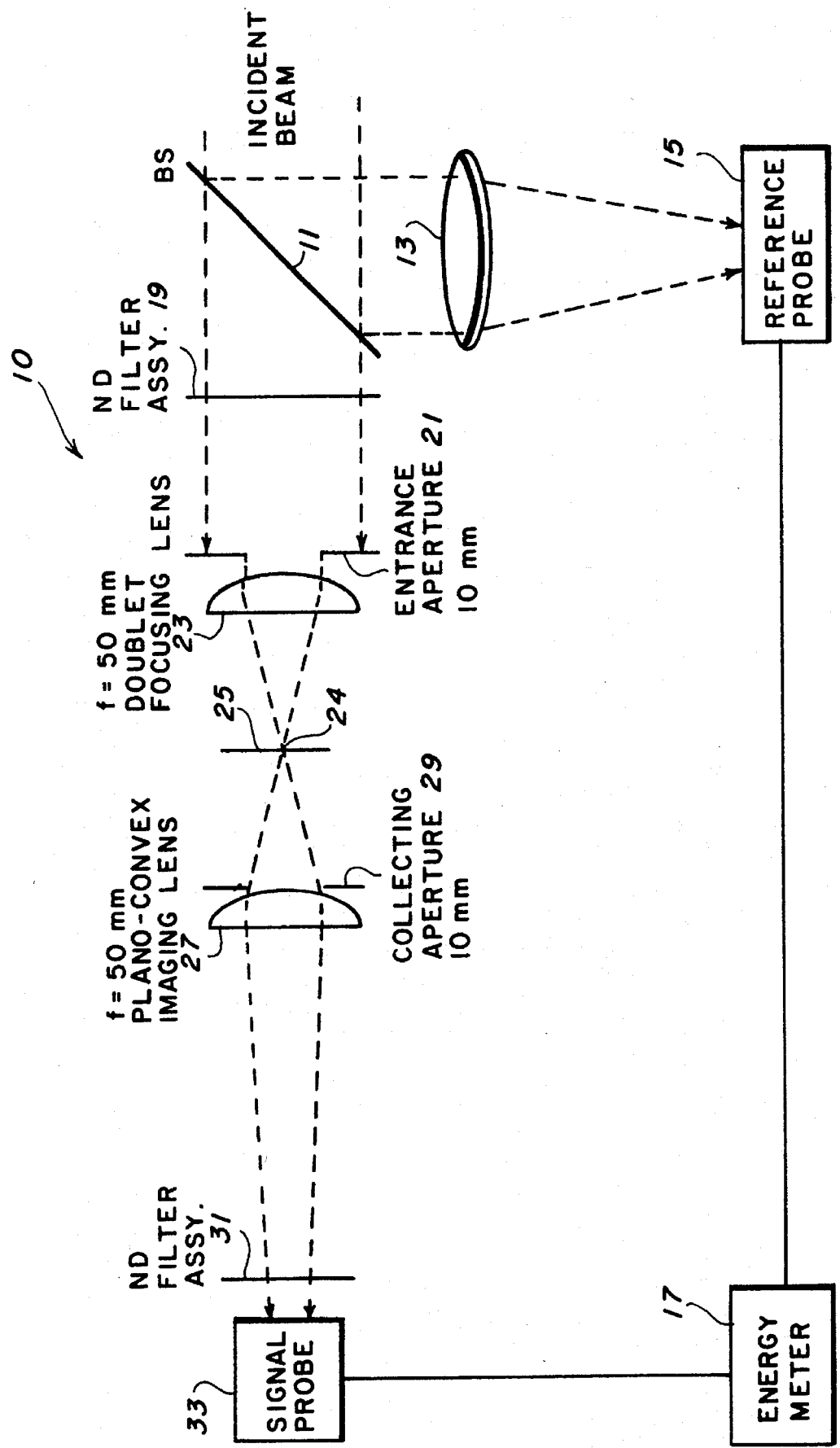
FIG. 1 illustrates a schematic diagram of the optical limiter apparatus of the invention utilized in an experimental system.

Referring now to the drawings, FIG. 1 illustrates a schematic diagram of a low f/number defocussing optical limiter apparatus of the invention utilized in an experimental system to characterize the invention. In the experimental system of FIG. 1, diffraction-limited f/5 experiments were performed at 532 nm with 6-ns-duration pulses from a frequency-doubled Q-switched Nd:YAG laser.

In the operation of the system of FIG. 1, the incident light beam from the laser is applied to a beam splitter (BS) 11. This incident light beam had a Gaussian spatial profile expanded to a $1/e^2$ diameter of 30 mm. About 8% of the incident beam reflects off of the beam splitter 11 and passes through a lens 13 which focusses the light into a reference probe 15. This reference probe 15 is a detector which measures the incident energy by converting the 8% portion of the incident light applied thereto into an analog electrical signal. The analog electrical signal from the reference probe 15 is then applied to an energy meter 17 which converts the analog signal into a digital signal which is digitally read out of the energy meter as the incident energy applied to the system of FIG. 1. Since the amount of incident light being applied to the reference probe 15 is known to be 8% of the total incident light applied to the system of FIG. 1, the energy meter 17 can be readily calibrated to indicate 100% of the total incident energy being received by the system of FIG. 1.

Since 8% of the total incident light is reflected by the beam splitter, the remaining 92% of the total incident light is transmitted through the beam splitter 11 to a neutral density (ND) filter assembly 19. The neutral density filter assembly 19 attenuates the incident light beam such that the transmission varies from ~0.001 to 0.5, depending on the specific filters used in the neutral density filter assembly 19.

It will be recalled that the incident beam had a Gaussian spatial profile expanded to a $1/e^2$ diameter of 30 mm. This incident beam from the neutral density filter 19 is truncated by a 10 mm diameter, entrance aperture 21 placed immediately before a focusing lens 23. The truncation yielded a top hat spatial profile. The focusing lens 23 is a 50 mm focal length, double-element lens which focuses the truncated incident beam to a focal point 24 inside of a sample cell, sample, cell or protective element 25. The $1/e^2$ radius of the beam at the focus 24, in air, is 3.0 μm.

The sample cell 25 contains a solution of absorbing material dissolved in a thermal solvent, with the solution in the cell 25 possessing refractive thermal nonlinearities. As will be explained later, the sample cell 25 is responsive to a focused incident light beam below a predetermined intensity level for passing therethrough the focused incident light beam below the predetermined intensity level; and the sample cell 25 is also responsive to a focused incident light beam at or above the predetermined intensity level for deflecting substantially all of the focused incident light beam in different directions and passing therethrough only a small portion of the converged incident light beam at or above the predetermined intensity level. Thus, the sample cell 25 provides no optical limiting of light passing through the sample cell 25 when the intensity of that light is below a predetermined intensity level, but does provide a relatively large amount of optical limiting of light by defocusing and producing strongly aberrated rings of light when the intensity of light passing through the sample cell 25 is at or above a predetermined intensity level (to be explained).

Light from the sample cell 25 passes through a 10 mm collecting aperture 27 which provides 100% transmission at low intensities of that light and blocks any strongly aberrated rings of light produced by the sample cell 25 in response to high intensities of that light. A 50 mm plano-convex imaging lens 29 is disposed right after the collecting aperture 27 to collect light passing through the collecting aperture 27 and focus that collected light through a neutral density filter assembly 31 into a signal probe 33.

The neutral density filter assembly 31 allows a known fraction of the light to be transmitted therethrough and absorbs a known fraction of the light. This filter assembly 31 passes ~0.1% to 50% of the light that is applied to the assembly 31, depending on the specific filters used in the neutral density filter assembly 31. The neutral density filter assembly 31 is similar in structure and operation to the neutral density filter 19 and, hence, requires no further description.

The signal probe 33 is a detector which measures the transmitted energy by converting the portion of the incident light that is applied thereto as transmitted light into an analog electrical signal. The analog electrical signal from the signal probe 33 is then applied to the energy meter 17 which converts the analog signal into a digital signal which is digitally read out of the energy meter 17 as the transmitted energy that is applied to the signal probe 33. The energy meter 17 can read each of the probes 15 and 33 and provide a dual reading.

All of the limiting data were obtained using single shots in order to avoid cumulative thermal effects or sample boiling. The reference pulse energies were measured with a calibrated pyroelectric energy meter, obtained from Laserprobe, Inc., Utica, N.Y. and having part number RJP-735. The transmitted pulse energies were measured with a more sensitive silicon photodetector energy meter operated in the linear regime, obtained from Laserprobe, Inc. and having part number RJP-765. The energy meter 17 was obtained from Laserprobe, Inc. and has part number RJ-7620. The incident energy was adjusted by rotation of a half-wave plate used in conjunction with a Glan prism and calibrated neutral density filter assembly 19.

FIGS. 2A and 2B illustrate schematic diagrams of the optical limiter apparatus of the invention under different operational conditions. Each of FIGS. 2A and 2B use the focusing lens 23, the protective element, sample cell, sample or cell 25, the collecting aperture 27 and the imaging or collecting lens 29 that are shown in FIG. 1. Each of these elements 23, 25, 27 and 29 in each of FIGS. 2A and 2B have the same structure and perform the same function as the corresponding elements shown in FIG. 1 and, hence, require no further description and discussion. However, in each of FIGS. 2A and 2B, the light transmitted through the imaging lens 29 is imaged onto an object to be protected, such as a sensor or human eye 35, rather than onto the signal probe 33 of FIG. 1.

In the operation of the thermal optical limiter 34 of FIG. 2A, a low fluence incident beam is focused by the focusing lens 23 to a focal point located at the center of the sample or protective element 25 (to be discussed later). Since this incident beam is a low fluence beam having an intensity below a predetermined threshold level, it passes through the optical limiter or protective element 25 without being defocused by the protected element 25, and then passes through the collecting aperture 27 and imaging lens 29 to the sensor 35 to be monitored.

In the operation of the thermal optical limiter 34 of FIG. 2B, a high fluence incident beam is focussed by the focusing lens 23 to the focal point located at the center of optical limiter (or sample or protective element) 25 (to be discussed later). Since this incident beam is a high fluence beam at or above a predetermined threshold level, the optical limiter (sample or protective element) 25 defocuses the high fluence incident beam, causing that incident beam to be strongly aberrated into several rings of aberrated light which are blocked by the collecting aperture 27. Only a strongly attentuated small portion of unaberrated light from the incident beam will be transmitted through the collecting aperture 27 and imaging lens 29 to be monitored by the sensor or eye 35 without damage to the sensor or eye 35.

FIGS. 3A and 3B illustrate the optical limiting operation of the optical limiter of FIG. 2B in response to the high fluence or high intensity incident light beam. FIG. 3A shows the profile of an incident light beam 37 as it would appear at the input of the focusing lens 23 (FIG. 2B) with no limiting. FIG. 3B shows the profile of the light beam 37 at the collecting aperture 27 after it was defocused by the nigrosin sample or cell 25 into an exemplary series of concentric strongly aberrated rings 41, 43 and 45 of light. The collecting aperture 27 blocks these strongly aberrated rings 41, 43 and 45 of light, while passing therethrough to the eye or sensor 35 only the strongly attenuated transmitted light 39 (that remains from the light beam 37).

Optical limiting of the thermal optical limiter apparatus 34 (of FIGS. 2A and 2B) was demonstrated using solutions of an organic dye, nigrosin, dissolved in a thermal solvent, such as preferably carbon disulfide ($CS_2$), which possess excellent refractive thermal nonlinearities. Other thermal solvents that may be used are carbon tetrachloride ($CCl_4$), methanol (MeOH) and chloroform ($CHCl_3$). The nigrosin is an absorber which simply acts to absorb light to heat up and then transfer that heat to the thermal solvent in which the nigrosin was dissolved.

A thermal solvent can be defined as any substance (solid, liquid or gas) that exhibits a change in index of refraction upon heating. An absorber can be defined as any substance or material that absorbs electromagnetic energy and transforms that energy into thermal energy in a surrounding medium.

A water soluble form of nigrosin was used in this work. Nigrosin (which is supplied by the Aldrich Chemical Co., Milwaukee, Wisc.) is characterized by an extremely broad and flat absorption over the entire visible and near IR spectral regions.

Figure 4:
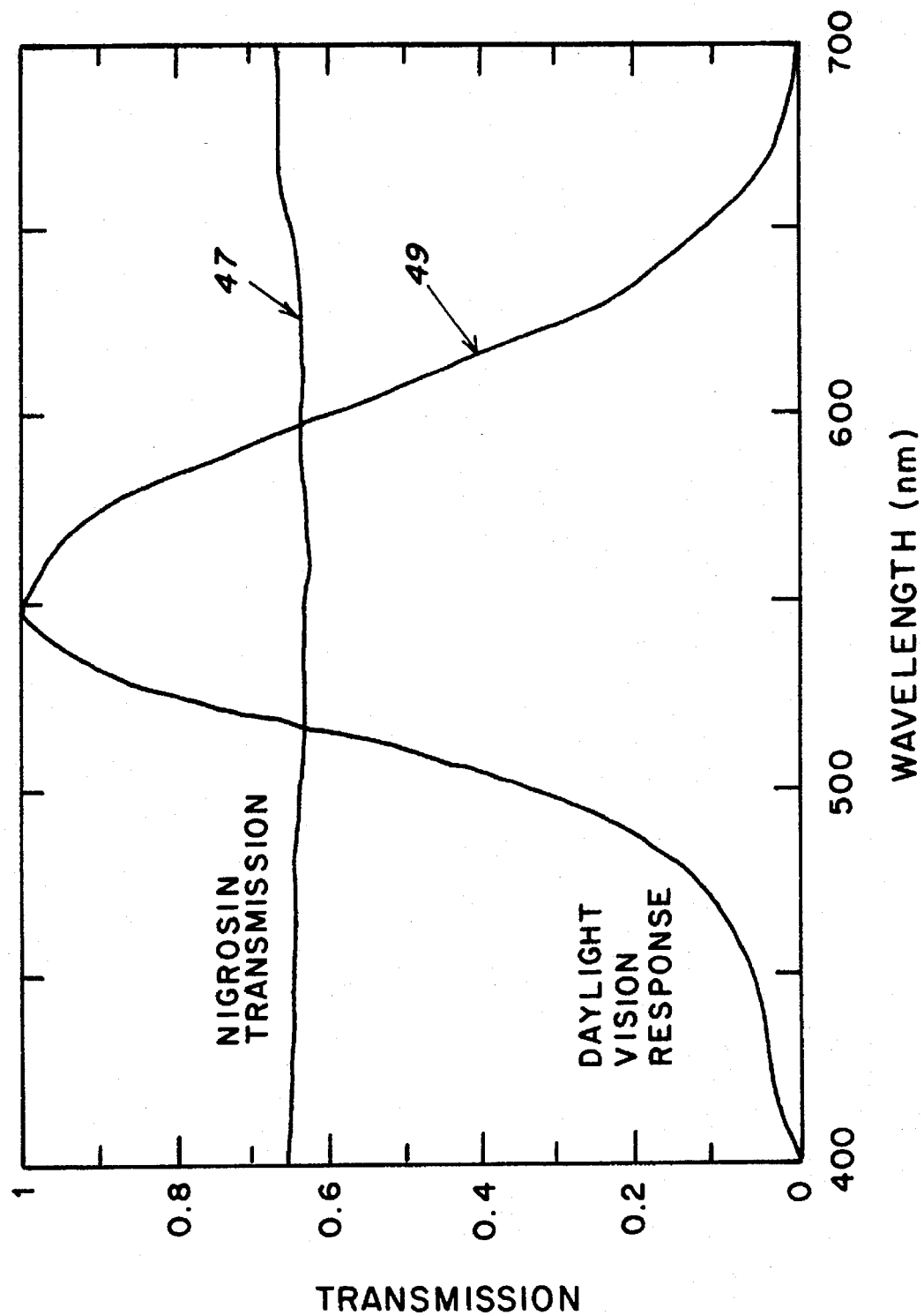
FIG. 4 shows the absorption spectrum of a nigrosin solution compared to the daylight vision response curve of the human eye.

FIG. 4 shows the absorption spectrum curve 47 of a nigrosin solution (not shown) compared to the daylight vision response curve 49 of the human eye. However, it should be noted that the present invention does not depend on the use of nigrosin as the absorber. Nogrosin is simply an example of a dye with a broadband absorption. Any other material that has a broad, flat absorption and that dissolves in a good thermal solvent will work equally as well as the nigrosin. The optical limiting device used in these limiting measurements consisted of a stainless steel cell or sample 25 holding two 1" diameter by ¼" thick fused silica windows (not shown) separated by a teflon gasket (not shown) 25 μm to 50 μm thick. The nigrosin/$CS_2$ solution was placed between the windows and sealed with an o-ring (not shown) upon assembly of the cell 25.

As stated above, FIG. 4 shows the absorption spectrum curve 47 of a nigrosin solution compared to the daylight vision response curve 49. The daylight vision response curve 49 is the response curve of the human eye and covers the wavelength range from 400 nm to 700 nm. The human eye can only see light that is underneath the curve 49 and that has wavelengths within this 400–700 nm wavelength range. The response of the human eye to light peaks at about 550 nm, which is where the eye can see most efficiently and then drops sharply off on the sides down to 400 nm and to 700 nm. For example, with two incident light sources of equal brightness, one at 400 nm and the other at 550 nm, the eye would see the 550 nm light as being very bright, but would hardly see the 400 nm light because the eye cannot respond to the 400 nm light.

For eye protection, the thermal optical limiter apparatus 34 of the invention must limit the intensity of light within this 400–700 nm wavelength range. For protecting the eye from wavelengths below 400 nm and above 700 nm, filters (not shown) could be inserted before, for example, the focusing lens 23 (FIGS. 2A and 2B) of the optical limiter apparatus 34 to block such wavelength ranges. For protection of a sensor 35, filters may not be needed, depending on the particular sensor being used.

Note that the nigrosin transmission response 47 in FIG. 4 is relatively flat across the entire 400–700 nm daylight vision response curve 49 of the human eye to provide good eye protection over this wavelength range. This means that the nigrosin sample or cell 25 will respond equally well to any wavelength within the 400–700 nm range. The nigrosin sample 25 is the optical limiter of the thermal optical limiter apparatus 34.

Figure 5A:
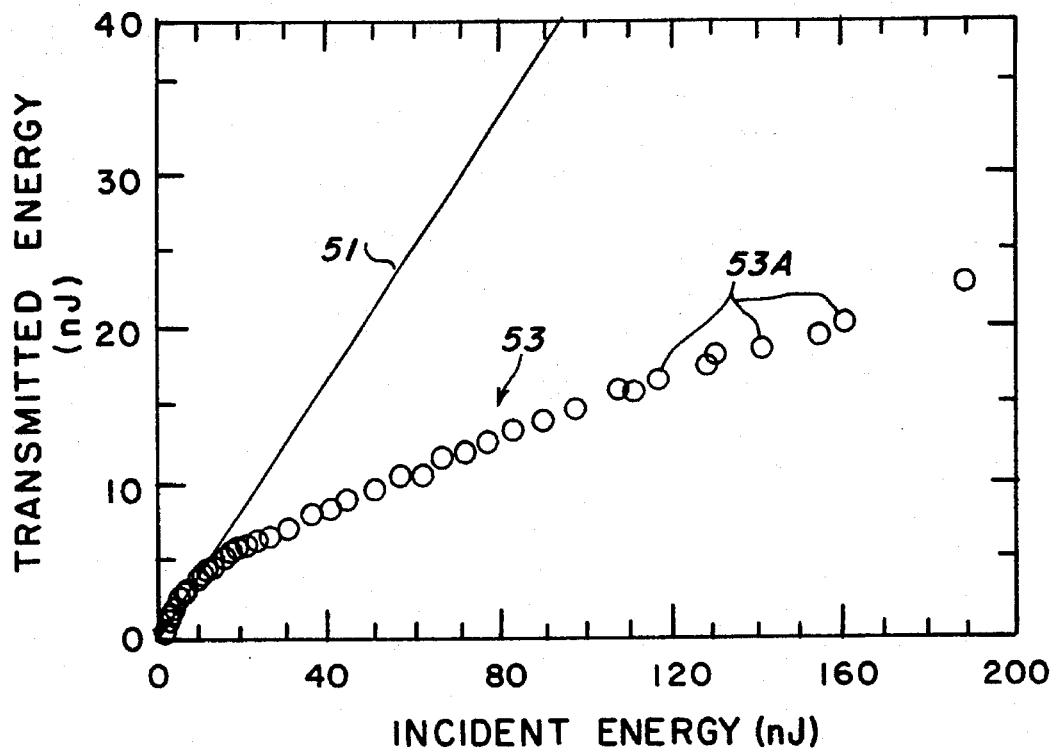
FIG. 5A shows the limiting performance of the optical limiter of the invention for a solution of nigrosin in carbon disulfide for incident energies up to 200 nJ.
Figure 5B:
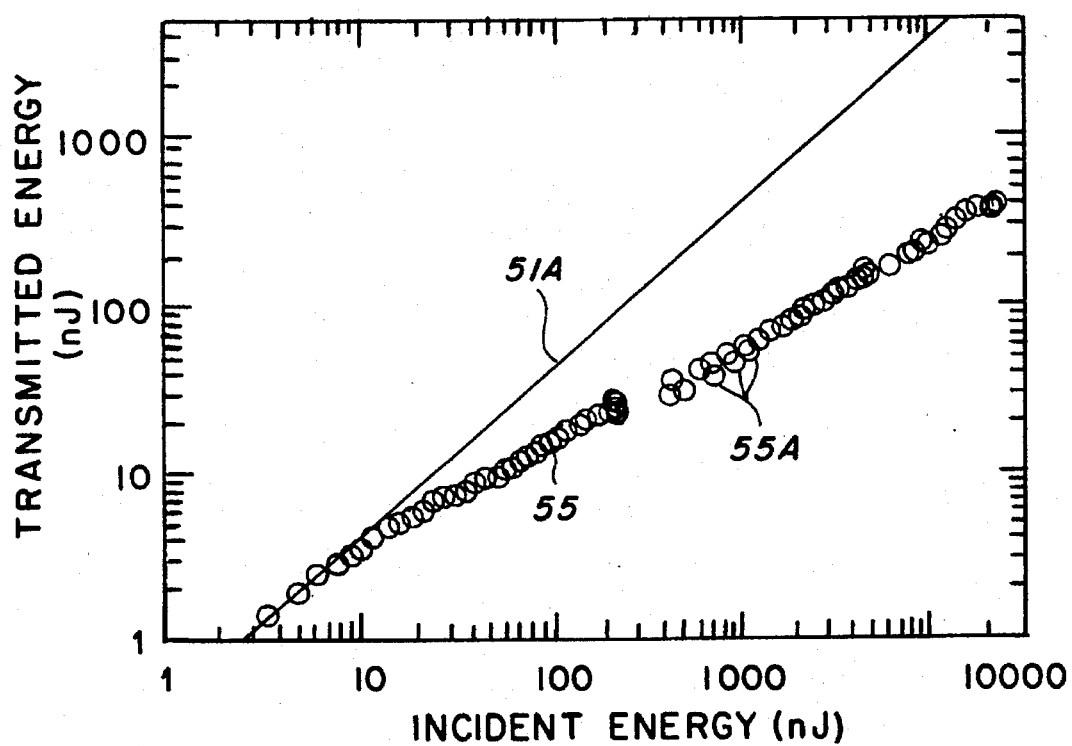
FIG. 5B is a log-log plot showing the limiting performance of the optical limiter of the invention for a solution of nigrosin in carbon disulfide for incident energies over the entire dynamic range of the optical limiter.

FIGS. 5A and 5B show the performance curves of the broadband thermal optical limiter apparatus of the invention shown in FIGS. 1, 2A and 2B. In each of FIGS. 5A and 5B, the horizontal axis represents the incident energy (in nJ) that was measured by the reference probe 15 (FIG. 1), and the vertical axis represents the transmitted energy (in nJ) that was measured by the signal probe 33 (FIG. 1).

FIG. 5A shows the limiting data that was obtained with 6 nsec (nanosecond) pulses at 532 nm for a solution of nigrosin in $CS_2$ ($\alpha l = 0.76$, where $\alpha$ is the absorption coefficient in units of $cm^{-1}$, and $l$ is the length of the cell 25 in $\mu m$) for energies up to 200 nJ. $CS_2$ displays the highest thermal figure of merit of common laboratory solvents. The straight line 51 is the system transmission (43%) of light through the solution of nigrosin in $CS_2$ that could be seen if there were no limiting. The circles 53A in the performance curve 53 represent the amounts of light that could be seen for associated amounts of incident light if the thermal optical limiter apparatus 34 (FIG. 2B) were limiting the incident light.

As shown in FIG. 5A, the performance curve 53 starts dropping below the straight line 51 after about 12 nJ of incident energy and continues dropping further and further away from the straight line 51 as the intensity of the incident energy increases. This shows that the performance of the thermal optical limiter apparatus 34 (of FIG. 2A or FIG. 2B) becomes increasingly better as the intensity of the incident energy increases.

The threshold for limiting, defined as that incident energy for which the transmitted energy is half the linear system transmission energy, occurs at ~40 nJ, which corresponds to a fluence of ~180 $mJ/cm^2$, assuming a focal beam radius of 3.6 $\mu m$ in $CS_2$. At about 40 nJ of incident energy the transmitted energy is down by about a factor of 2 from a linear or low fluence transmission. Thus, as shown in FIG. 5A, for an exemplary incident energy of 200 nJ, only 24 nJ of energy would be transmitted. Note, for example, that if the cell or sample 25 (FIG. 2B) were removed from the thermal optical limiter apparatus 34 of FIG. 2A, about 200 nJ of incident light energy would reach the sensor or eye 35.

FIG. 5B is a log-log plot showing the limiting performance of the optical limiter apparatus of the invention for a solution of nigrosin in carbon disulfide for incident energies over the entire dynamic range of the optical limiter. While FIG. 5A shows an incident energy range of from 0 to 200 nJ, FIG. 5B shows an incident energy range which extends up to about 25,000 nJ. Thus, FIG. 5A shows only a small portion of the expanded scale of FIG. 5B.

The straight line 51A is the system transmission (43%) of light through the solution of nigrosin in $CS_2$ that could be seen if there were no limiting. The circles 55A in the performance curve 55 represent the amounts of light that could be seen for associated amounts of incident light if the thermal optical limiter apparatus 34 (FIG. 2B) were limiting the incident light. The slope of the curve is constant, with a value of 0.59. The maximum transmitted energy is only ~400 nJ for incident energies of ~20 $\mu J$, representing a net transmission of only 2. This limiting performance, when used with optics having an area of 1 $cm^2$ or greater, is below the retinal maximum permissible exposure level. Above 20 $\mu J$ of incident energy the transmission of the thermal optical limiter apparatus 34 decreases dramatically due to the formation of microplasmas which scatter and reflect the light. The solution is self healing after the formation of such a plasma and the low level light transmission characteristics are restored.

Figure 6:
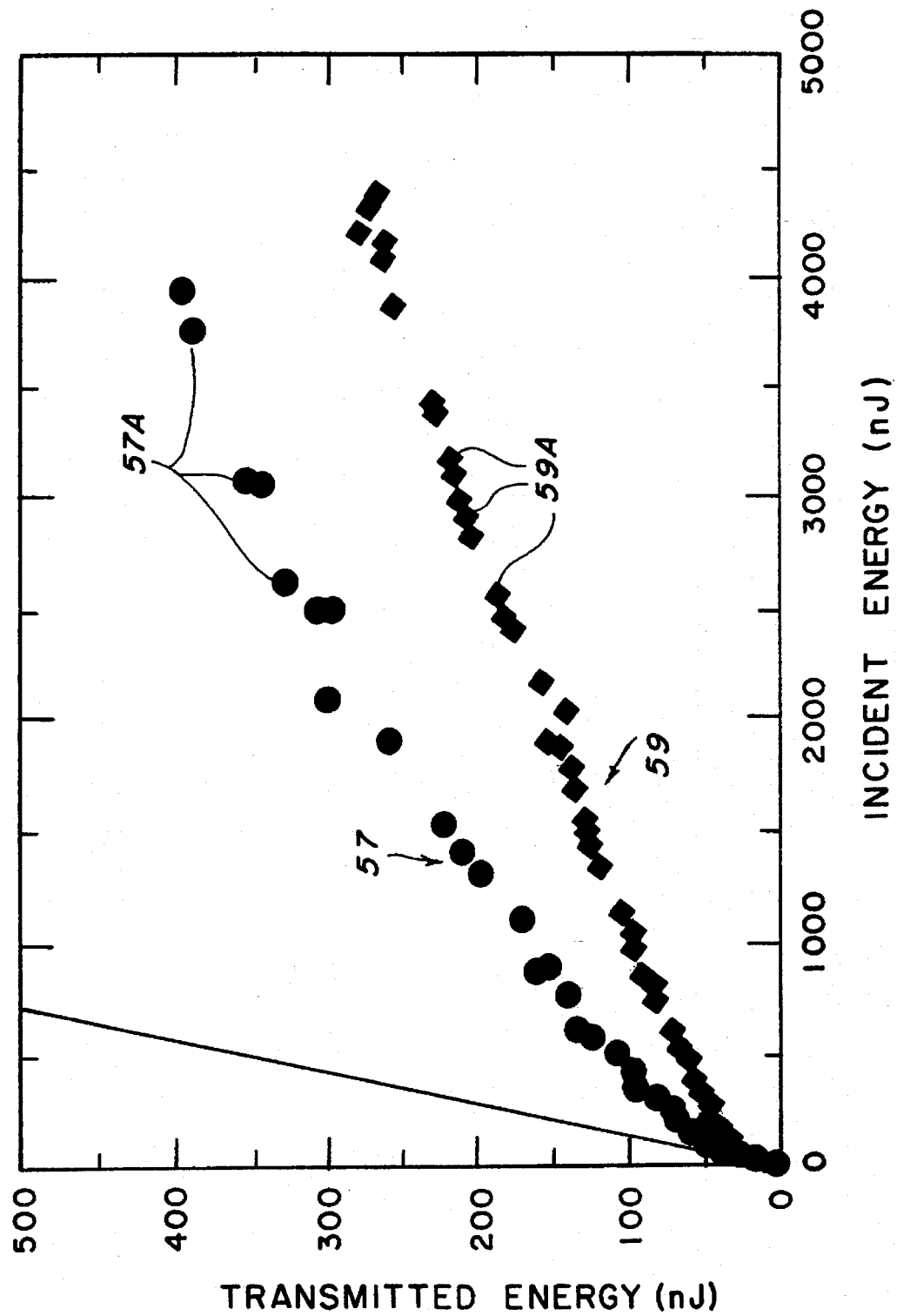
FIG. 6 shows the limiting data of the thermal limiter of the invention using a linear absorbing material (nigrosin) compared to the limiting data of a thermal limiter of the invention using a nonlinear absorbing material known as a reverse saturable absorber (RSA) material, such as $C_{60}$.

FIG. 6 illustrates a comparison of the performance curve 57 of a purely thermal optical limiter with the performance curve 59 of an thermal/RSA optical limiter in which the thermal nonlinearity feature is combined with, and augmented by, a reverse saturable absorber (RSA) feature. More particularly, FIG. 6 illustrates the improvement in the performance of the thermal optical limiter apparatus 34 (FIGS. 2A and 2B) when the thermal nonlinearity is combined with and augmented by a reverse saturable absorber. Data in the performance curve 59 for such a thermal/RSA limiter is compared to data in the performance curve 57 for a purely thermal optical limiter. As indicated in the performance curves 57 and 59, each limiter has the same low fluence (linear) transmission T, where T=75%. The solid circles 57A in the performance curve 57 represent data for a solution of nigrosin in 1-chloronaphthalene (1-CN) (a purely thermal limiter) obtained at 532 nm using 6 ns duration pulses. The solid diamonds 59A in the performance curve 59 represent data for a solution of $C_{60}$ (buckminsterfullerene) in 1-chloronaphthalene (a thermal/RSA limiter), also obtained at 532 nm using 6 ns duration pulses.

At low fluence, the linear transmission of the thermal/RSA limiter is identical to that of the purely thermal limiter (absorption=25%). However, at high incident fluence, while the absorption of the purely thermal limiter remains constant at 25%, the absorption of the thermal/RSA limiter increases. This increased absorption of the thermal/RSA limiter not only gives an immediate additional light attenuation, but also leads to the deposition of more heat in the thermal solvent and subsequently causes additional thermal defocusing and aberration of the incident light beam. The overall limiting performance can be improved significantly by appropriate choice of the RSA material and solvent.

The performance of the thermal/RSA limiter can be superior to that of either a thermal limiter alone or an RSA limiter alone. The ideal thermal/RSA limiter would utilize an RSA material with a broad spectral absorption and a very large excited state extinction coefficient over the same spectral range.

ADVANTAGES AND NEW FEATURES OF THE INVENTION

There are several advantages that are realized with this invention over the prior art:

a. The nigrosin/thermal optical limiter limits the transmitted fluence to levels below the threshold level for eye damage for all input fluences studied by applicants. This exceptional level of performance, demonstrated at 532 nm, is expected to be maintained for all visible and near infrared wavelengths. No optical limiter demonstrated previously can make such a claim.

b. The transmission of the nigrosin limiter for low intensity light is excellent over the entire visible and near infrared spectral regions. This is due to the extremely flat absorption spectrum of the nigrosin for all wavelengths. The color of the nigrosin optical limiter, when viewed by eye with white light illumination, is a neutral grey with a purple cast. Identification of an absorber with no structure whatsoever in its absorption spectrum would presumably yield an ideal neutral grey limiter. Due to this near neutral appearance, the nigrosin limiter offers an almost perfect match to the human eye daylight and nighttime vision responses. No optical limiter demonstrated previously can make this claim.

c. The temporal response of the broadband thermal optical limiter extends from approximately 1 nanosecond to approximately 100 microseconds. Other limiters can protect for either short pulses or long pulses, but not both.

d. The nigrosin solutions are extremely photochemically stable and will retain their limiting properties after long periods of storage or after extended exposure to bright sunlight. The nigrosin solutions are also self healing after plasma formation at high fluences. Solid materials, such as semiconductors, suffer permanent optical damage (pits and fractures) at high fluences. Organic $\chi^{(3)}$ materials in solution undergo permanent photochemical changes which alter their electronic nonlinear properties and their limiting behavior.

e. Nigrosin is a commercially available material, costing approximately $100/50 grams. Only approximately 100 milligrams of nigrosin (about $0.20 of material) were used in these limiting experiments. The availability of materials used in other limiters can be quite limited and the cost of most materials used in the prior art is significantly higher than pennies. If the cost of the research and development of such materials is included, the total cost can often be hundreds of thousands of dollars.

ALTERNATIVES

Improvements to the basic broadband optical limiter have been demonstrated or are envisioned and are discussed below.

a. Solvent Figure of Merit

The limiting threshold and ultimate limiting efficiency of the broadband thermal optical limiter depends on the thermal figure of merit, F, of the solvent, which is defined as the ratio of the temperature coefficient of the index of refraction, dn/dT, to the product of the density, p, and the heat capacity, c, of the solvent.

$$F = dn/dT \, (1/\rho c)$$

Several common laboratory solvents have significant values of the thermal figure of merit. Optical limiting with the broadband nigrosin limiter has been demonstrated in several solvents, including carbon disulfide, carbon tetrachloride, chloroform, and 1-chloronaphthalene. Of these solvents, $CS_2$ has the largest thermal figure of merit and yielded superior limiting results. Identification of a host solvent or material, such as a liquid crystal or other material, with a larger thermal figure of merit will further improve the broadband nigrosin limiter.

b. Temporal Response

The short temporal response of the thermal limiter depends on the time it takes an acoustic wave to travel across the focused beam. Therefore, more tightly focused beams yield faster thermal response times and can afford protection against correspondingly shorter incident laser pulses, while no sacrifice in the protection against longer pulses occurs. Use of lower f/number optics will accomplish this. This patent application has described extremely effective limiting using 6 nsec duration pulses and f/5 optics. Use of lower f/number optics, such as f/1, for example, should extend the temporal response of the limiter to subnanoseconds.

c. Enhancement by Excited State Absorption (Reverse Saturable Absorption)

The limiting threshold and overall performance of a thermal limiter can be improved by hybridization with a reverse saturable absorber (RSA). A material which exhibits RSA has an excited state for which the absorption coefficient is greater than that of the ground state.. This means that once light is absorbed by the material, as long as the excited state persists, then the material can absorb more photons. In some RSA materials the excited state absorption can, in principle, absorb many times more photons than the ground state. This unique property can be used to advantage in the thermal optical limiter of the invention. Despite a fixed low level light absorption, the absorption of a thermal/RSA limiter increases at higher intensities. This increased absorption leads to additional solvent heating and an enhanced thermal nonlinearity. Thus, the performance of a thermal/RSA limiter can be superior to that of a pure thermal limiter, assuming all other characteristics are unchanged. The concept of a thermal/RSA limiter was tested and found to be successful using a solution of Buckminsterfullerene, a known RSA material, in 1-chloronaphthalene. The ultimate utility of the thermal/RSA hybrid limiter depends on the ability to find a suitable RSA material which has broadband ground and excited state absorption spectra, a long-lived excited state, good solubility in a superior thermal solvent, good photochemical stability, and low cost.

d. Fabrication of a Broadband Thermal Optical Limiter Using Microlens Arrays

The optical limiter described in this application used a single lens system with very high optical magnification. The dimensions of the defocusing limiter apparatus are a minimum of 100 mm in the direction of the beam (f= 50 mm focusing and collimating lenses). In order to reduce the size of the broadband thermal limiter and provide for the manufacture of eye protection goggles that could be comfortably worn, the use of microlens arrays to provide the required intermediate focus is proposed. Recent studies by Optical Shields, Inc., using liquid crystal materials between two sheets of microlens arrays manufactured by Corning, Inc., have demonstrated the feasibility of optical limiting using such technology. Improvements in the manufacture of the microlens arrays have increased the optical magnification from about 500 to over 20,000. Use of microlens arrays in conjunction with the broadband thermal limiter will be feasible if an additional tenfold or better increase in the optical gain can be realized.

Therefore, what has been described in a preferred embodiment of the invention is a passive optical limiter comprising: a first optical device for converging an incident light beam to a focal point; a protective element disposed at the focal point, the protective element being responsive to a converged incident light beam below a predetermined intensity level for passing therethrough converged incident light beam below the predetermined intensity level, the protective element being responsive to a converged incident light beam at or above the predetermined intensity level for deflecting substantially all of the converged incident light beam in different directions and passing therethrough only a small portion of the converged incident light beam at or above the predetermined intensity level; and a second optical device for focusing substantially all of the light passing through the protective element onto a light-sensitive object.

It should therefore readily be understood that many modifications and variations of the present invention are possible within the purview of the claimed invention. It is therefore to be understood that, within the scope of the appended claims, the invention may be practiced otherwise than as specifically described.

What is claimed and desired to be secured by letters patent of the United States is:

1. A passive optical limiter for protecting a light-sensitive object from damage due to an incident light beam above a predetermined value of light intensity, said passive optical limiter comprising:

first optical means for focusing an incident light beam to a focal point;

a protective element disposed at the focal point, said protective element being responsive to a focused incident light beam below a predetermined intensity level for passing therethrough the focused incident light beam below the predetermined intensity level, said protective element being responsive to a focused incident light beam at or above the predetermined intensity level for deflecting substantially all of the focused incident light beam in different directions and passing therethrough only a small portion of the focused incident light beam at or above the predetermined intensity level; and second optical means for focusing substantially all of the light passing through said protective element onto the light-sensitive object.

2. The passive optical limiter of claim 1 wherein said protective element comprises:

a cell;

a solution of absorbing material dissolved in a solvent, said solution being disposed in said cell and possessing refractive thermal nonlinearities.

3. The passive optical limiter of claim 2 wherein:

said absorbing material being responsive to a portion of the converged incident light beam at or above the predetermined intensity level for heating up and transferring heat to said solvent; and said solvent having a sufficiently large thermal figure of merit to provide a predetermined limiting threshold for protecting a light sensitive object from damage due to a light beam with a predetermined value of light intensity and being responsive to the heat transferred from said heated absorbing material for thermally defocusing substantially all of the converged incident light beam at or above the predetermined intensity level.

4. The passive optical limiter of claim 2 wherein:

said solution of absorbing material is a solution of nigrosin; and said solvent is carbon disulfide.

5. The passive optical limiter of claim 4 wherein:

said nigrosin has an extremely broad and flat absorption over the entire near ultraviolet, visible and near infrared spectral regions.

6. The passive optical limiter of claim 4 wherein:

said nigrosin acts to absorb light and then transfer heat to said carbon disulfide solvent.

7. The passive optical limiter of claim 1 further including:

a collecting aperture disposed in front of said second optical means for substantially blocking all light deflected by said protective element and passing therethrough into said second optical means only a small portion of the focused incident light beam at or above the predetermined intensity level.

8. The passive optical limiter of claim 1 wherein:

said first optical means is a focusing lens.

9. The passive optical limiter of claim 1 wherein:

said second optical means is a imaging lens.

10. A broadband thermal optical limiter for protecting a light-sensitive object from intense laser beams at all near ultraviolet, visible and near infrared wavelengths, said optical limiter comprising:

a sample cell containing a solution of absorbing material dissolved in a solvent;

first optical means for converging an incident laser beam into said sample cell, said sample cell being responsive to a converged incident laser beam below a predetermined intensity level for passing therethrough the converged incident laser beam below the predetermined intensity level, said sample cell being responsive to a converged incident laser beam at or above a predetermined intensity level for thermally defocusing substantially all of the converged incident laser beam in different directions and passing therethrough only a remaining small portion of the converged incident laser beam at or above the predetermined intensity level; and second optical means for focusing substantially all of the laser beam passing through said sample cell into the light-sensitive object to be protected.

11. The optical limiter of claim 10 wherein:

first optical means focuses the incident laser beam to a focal point in said sample cell.

12. The optical limiter of claim 10 wherein: said absorbing material acts to absorb light and then transfer heat to said solvent.

13. The optical limiter of claim 10 wherein:

said solution of absorbing material is a solution of nigrosin; and said solvent is carbon disulfide.

14. The optical limiter of claim 13 wherein:

said nigrosin has an extremely broad and flat absorption over the entire near ultraviolet, visible and near infrared spectral regions.

15. The optical limiter of claim 13 wherein:

said nigrosin acts to absorb light and then transfer heat to said carbon disulfide solvent.

16. The optical limiter of claim 13 wherein:
said first optical means is a focusing lens; and
said second optical means is an imaging lens.

17. The optical limiter of claim 13 wherein:
said first optical means converges the incident laser beam to a focal point in said sample cell.

* * * * *